United States Patent
Hauschild et al.

(10) Patent No.: US 9,758,150 B2
(45) Date of Patent: Sep. 12, 2017

(54) METHOD AND DEVICE FOR DISPLAYING INFORMATION

(75) Inventors: Frank Hauschild, Berlin (DE); Rainer Dehmann, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 435 days.

(21) Appl. No.: 13/394,313

(22) PCT Filed: Aug. 19, 2010

(86) PCT No.: PCT/EP2010/005078
§ 371 (c)(1),
(2), (4) Date: May 2, 2012

(87) PCT Pub. No.: WO2011/026564
PCT Pub. Date: Mar. 10, 2011

(65) Prior Publication Data
US 2012/0206484 A1 Aug. 16, 2012

(30) Foreign Application Priority Data

Sep. 4, 2009 (DE) .......... 10 2009 040 268
Jun. 4, 2010 (DE) .......... 10 2010 022 721

(51) Int. Cl.
*G09G 5/00* (2006.01)
*B60W 10/24* (2006.01)
(Continued)

(52) U.S. Cl.
CPC ......... *B60W 10/24* (2013.01); *B60R 16/0236* (2013.01); *G06F 3/0483* (2013.01)

(58) Field of Classification Search
None
See application file for complete search history.

(56) References Cited

U.S. PATENT DOCUMENTS

| 5,621,874 A | 4/1997 | Lucas et al. |
| 6,012,072 A * | 1/2000 | Lucas et al. .................. 715/210 |

(Continued)

FOREIGN PATENT DOCUMENTS

| CN | 1841293 | 10/2006 |
| CN | 101196893 | 6/2008 |

(Continued)

OTHER PUBLICATIONS

International Preliminary Report on Patentability and Written Opinion, issued in corresponding International Application No. PCT/EP2010/005078.

(Continued)

*Primary Examiner* — David H Chu
(74) *Attorney, Agent, or Firm* — Andrews Kurth Kenyon LLP

(57) ABSTRACT

In a method for displaying a plurality of two-dimensional, ordered objects on a display area, a user-interface device generates graphics data that control the display area such that a subset of the objects is displayed in perspective, a first object of this subset being displayed in perspective in the foreground, and in response to an input with the aid of an input device, an arithmetic logic unit of the user-interface device alters the graphics data such that a different, second object is displayed in perspective in the foreground. The graphical objects are displayed in perspective, positioned one behind the other in a stack, the object displayed in the foreground forming the front face of the stack, and in response to the input, the graphics data are altered such that the first object and the objects disposed between the first and second object in the stack are moved in a direction perpendicular to the stack axis and are hidden, or the objects ordered between the first and second object, and the second object are made visible and are moved in a direction (Continued)

perpendicular to the stack axis until the second object is displayed in perspective in the foreground. An associated device is adapted for carrying out the method, and a vehicle includes such a device.

13 Claims, 6 Drawing Sheets

(51) Int. Cl.
B60R 16/023 (2006.01)
G06F 3/0483 (2013.01)

(56) References Cited

U.S. PATENT DOCUMENTS

| | | | |
|---|---|---|---|
| 6,088,032 A * | 7/2000 | Mackinlay | 715/848 |
| 6,253,218 B1 * | 6/2001 | Aoki et al. | 715/201 |
| 7,557,804 B1 | 7/2009 | McDaniel | |
| 7,761,812 B2 * | 7/2010 | Ostojic et al. | 715/835 |
| 8,587,528 B2 * | 11/2013 | Chaudhri | G06F 3/0482 345/173 |
| 2003/0163468 A1 * | 8/2003 | Freeman et al. | 707/7 |
| 2004/0150657 A1 * | 8/2004 | Wittenburg et al. | 345/619 |
| 2004/0155905 A1 * | 8/2004 | Arai | G06F 3/0362 715/773 |
| 2004/0233239 A1 * | 11/2004 | Lahdesmaki | 345/810 |
| 2006/0048076 A1 * | 3/2006 | Vronay et al. | 715/850 |
| 2007/0045961 A1 | 3/2007 | Morris | |
| 2007/0189737 A1 * | 8/2007 | Chaudhri et al. | 386/125 |
| 2008/0092038 A1 * | 4/2008 | Audet | 715/243 |
| 2008/0120571 A1 | 5/2008 | Chang et al. | |
| 2008/0215240 A1 * | 9/2008 | Howard et al. | 701/213 |
| 2008/0307351 A1 * | 12/2008 | Louch et al. | 715/782 |
| 2009/0210388 A1 * | 8/2009 | Elson | G06F 17/30241 |
| 2010/0211872 A1 * | 8/2010 | Rolston | G06F 3/0482 715/702 |
| 2011/0205162 A1 | 8/2011 | Waeller et al. | |

FOREIGN PATENT DOCUMENTS

| | | |
|---|---|---|
| DE | 10 2007 039 442 | 2/2009 |
| DE | 21 2007 000 053 | 3/2009 |
| EP | 2 068 237 | 6/2009 |
| WO | 2007/121557 | 11/2007 |

OTHER PUBLICATIONS

International Search Report, issued in corresponding International Application No. PCT/EP2010/005078.
P. Thurrott, "*Windows Vista Feature Focus: Windows Flip and Flip 3D,*" Internet Citation, p. 1-4, Aug. 25, 2008.
K. Higashino, "*WinFlip v. 0.42 Readme,*" Internet Citation: http://winflip.stylekings.de/wiki/doku.php?id=readme_en.txt, p. 1-4.
K. Wittenburg, et al., "*Rapid Serial Visual Presentation Techniques for Consumer Digital Video Devices,*" Internet Citation: http://www.merl.com/reports/docs/TR2003-19.pdf, Aug. 2003.

* cited by examiner

METHOD AND DEVICE FOR DISPLAYING INFORMATION

FIELD OF THE INVENTION

The present invention relates to a method for displaying a plurality of two-dimensional, ordered objects on a display area, in which a user-interface device generates graphics data that control the display area such that a subset of the objects is displayed in perspective, a first object of this subset being displayed in perspective in the foreground, and in response to an input with the aid of an input device, an arithmetic logic unit of the user-interface device alters the graphics data such that a different, second object is displayed in perspective in the foreground. The present invention further relates to an associated device for displaying information. In particular, the method and the device may be used in a vehicle.

BACKGROUND INFORMATION

Graphical user interfaces are familiar especially in the case of computers and operator-control systems of electronic equipment, where they allow the user to interact with the machine via graphical symbols, also denoted as objects. These objects may be controlled in various manners. For instance, they may be selected or shifted with the aid of a mouse, via a touch-sensitive display area or by way of gestures which are detected in front of or on the display area and converted into control signals.

In order to provide a user with as simple and intuitive a user interface as possible, various methods have been developed which are geared to the specific ergonomic and/or situation-dependent requirements. In designing an operator-control system customized in this manner, both the motor capabilities and the visual perception of the user for specific operator-control situations are taken into account.

U.S. Patent Application Publication No. 2008/0120571 describes a method for displaying digital objects with the aid of virtual stacking in order to attain a perspective or stereoscopic impression. In that case, the stacking and overlapping rules are alterable by the user depending on his/her desires and requirements. In particular, icons or thumbnails, but also other digital objects such as texts are able to be displayed using the method.

U.S. Pat. No. 5,621,874 describes a method for displaying electronic documents on a computer-controllable display area, the documents displayed being shown along a path in a perspective, three-dimensional stacking. The path may assume any one-dimensional form as desired, e.g., a straight line or a screw.

In a motor vehicle, there are various areas of information and communication to which indicating instruments are assigned. They are used to provide information to the driver and passengers. Moreover, they are able to assist the driver in navigation or communication with the outside world. In particular, the display is able to visually represent vehicle data related to traffic or operation. Typically, what is termed an instrument cluster is disposed in the vicinity of the primary field of view of the driver. Usually it is located in the cockpit behind the steering wheel and is visible through an opening in the steering wheel. It is used especially to display the speed, the fuel-tank level, the radiator temperature and other motor-vehicle information related to operation. In addition, radio and audio functions may be displayed. Finally, menus for telephone, navigation, telematic services and multimedia applications may be displayed. Liquid-crystal displays in various forms are usually used as display.

Meanwhile, because of the increase in electronic devices in vehicles, there has also been a move to equip vehicles with an operator-control system that has a graphical user-interface device to permit control of the various vehicle devices indicated above, with the aid of a few operating elements. In particular, it is desirable to display the information such that the driver is able to absorb it quickly and intuitively, so that apprehension of the displayed information does not cause the driver to be distracted while driving. Furthermore, the control should be able to be carried out so intuitively, easily and quickly that the driver is able to operate the vehicle devices, whose information is shown by the display device, even while driving. The display of information and the operator control associated with a display of information in the motor vehicle thus contribute to safety when driving the vehicle.

German Patent Document No. 10 2007 039 442 describes a method for displaying information in a vehicle, in which objects are shown disposed on a virtual ring, represented in perspective. In response to an operator-control action, the graphics data are altered such that the objects on the virtual ring rotate like a carousel. In particular, the virtual ring is displayed three-dimensionally in perspective, in an inclined view from above, so that not only the objects on the front portion of the virtual ring are visible, but also objects on the back side of the virtual ring.

SUMMARY

Example embodiments of the present invention provide an alternative method and an associated device, which permit a rapid, intuitive and simple operator control.

In the method, the graphical objects are displayed in perspective, positioned one behind the other in a stack, the object displayed in the foreground forming the front face of the stack, and in response to the input by a user, the graphics data are altered such that the first object and the objects disposed between the first and second object in the stack are moved in a direction perpendicular to the stack axis and are hidden, or the objects ordered between the first and second object, and the second object are made visible and are moved in a direction perpendicular to the stack axis until the second object is displayed in perspective in the foreground. Displaying the objects in a perspective stack has the advantage that even if a multitude of objects is displayed graphically, the observer is able to concentrate on the object displayed on the very top at the front face, without losing sight of the order of the objects in so doing.

The unhiding movement to the front face of the stack or the hiding movement of the objects away from the front face of the stack makes it easier for the user to visually comprehend the connection between the original view and the newly generated view. In this context, the perspective stack axis typically lies substantially in the direction perpendicular to the display area or has at least a relatively large component in this direction. Advantageously, the perspective view is slightly tilted so that, for example, the objects in the stack appear in perspective one behind the other, and at the same time, shifted slightly upward.

The objects to be hidden are typically moved in a predetermined direction, e.g., downward, and made invisible. Optionally, the movement and the hiding may also be shown such that a hidden object is sorted in again in perspective in the background at the end of the stack or at a predetermined position. The user may thereby more easily grasp visually, where the objects were moved. The unhiding may be carried out analogously in the opposite manner.

In particular, the first object and the objects disposed between the first and second object are hidden one after another, or the objects ordered between the first and second object, and the second object are made visible one after another. The user may thereby more easily grasp visually, how many objects were moved. Alternatively, however, the objects may also be made visible or invisible block-by-block.

The objects may belong to an operator-control system having a hierarchical menu structure. A menu displays various menu items and, if applicable, graphics or icons assigned to the menu items. Upon selection of a menu item, a submenu having further submenu items opens. The choice may be made in, e.g., a conventional manner, e.g., with the aid of a mouse, via a touch-sensitive display area or by gestures which are detected in front of or on the display area and are converted into control signals. The menu structure may be continued over several hierarchical levels. In addition, instead of being assigned a submenu, a menu item may be assigned a specific display image which represents the information assigned to the menu item.

In the method, the stack displayed corresponds in particular to one hierarchical level in the menu, the input in the method permitting navigation within the hierarchical level. Thus, the selection of an object corresponds in particular to a change to a different hierarchical level in the menu structure or to the triggering of a function to be controlled via the menu. In this connection, it is expedient that only the object forming the front face of the stack is selectable. In this manner, an operating error in a moving environment, e.g., when using the method during a bumpy ride in a vehicle, may be reduced.

At least two stacks of objects may be shown on the display area, in which case, it may be provided that the view of the stacks represent the number of objects contained in the stack. One possibility for displaying the number of objects in the stack lies in the different perspective depth of the individual stacks. Another possibility lies in the perspective arrangement and representation of all objects in the stack.

The stacks of objects may be shown in a display mode or an operator-control mode, substantially only the objects forming the front face being shown in the display mode. On the other hand, in the operator-control mode, all objects contained in the stack are shown or, in the case of large stacks, a portion of the objects. In this context, the objects in the stack may be displayed such that even objects within the stack, thus, not only the objects forming the front face, may be selected.

The stacks may be shown in the display mode, and when an operator-control device is approached, e.g., by a hand, the mode is switched to the operator-control mode.

For instance, the input is accomplished via an input device in the form of a manual operator-control element, which is set apart spatially from the displayed stack or from the display area. The manual operator-control element may be disposed as a push-button switch or slide switch next to the display area, and, for example, have a permanently assigned scrolling function (also known as scrollbar or page-up/down function). Alternatively, such an operator-control element may also be in the form of a SoftKey, where the function is displayed in context-specific manner on an area of the display area assigned to the operator-control element.

The input may be accomplished by an operator-control action executable bidirectionally, the objects disposed between the first and second object being hidden or unhidden as a function of the direction of the operator-control action. For example, a slide switch mentioned above, or an analogously implemented button is moved upward, whereupon new objects are made visible from below, in a direction perpendicular to the stack axis. Conversely, by an opposite operator-control action, the objects may be moved downward perpendicular to the stack axis, and hidden. The same orientation of the operator-control action and the direction in which the objects are hidden or unhidden may be assimilated well visually by the user, and therefore permits an especially intuitive operator control.

The input is not limited just to the manual operator-control elements already mentioned above. In particular, the objects may be shown on a display area having a touch-sensitive surface, and the input may be accomplished by a gesture on the touch-sensitive surface. For instance, the user sweeps his finger quickly from the bottom to the top over a defined region on the display area. Furthermore, an input may also be accomplished via buttons, which are displayed on the display area, set apart spatially from the displayed stack.

A button should be understood to be a control element of a graphical user interface. In response to a selection of a button, a function assigned to it is carried out, for instance, by controlling a device whose operation is supported by the information display. Thus, the buttons may replace conventional mechanical switches. The buttons may be produced and displayed as desired on a freely programmable display area.

In particular, the graphical objects represent menu items of a user menu, the media file of an infotainment device or options of a telecommunications system in a vehicle.

The device for displaying a plurality of two-dimensional, ordered objects includes a display area for displaying at least one subset of the objects in perspective; a user-interface device by which graphics data of the objects are able to be generated and are able to be altered with the aid of an arithmetic logic unit, a first object being displayable in perspective in the foreground; and an input device, coupled to the user-interface device, for detecting an input by which, with the aid of the arithmetic logic unit of the user-interface device, the graphics data are alterable such that a different, second object is displayable in perspective in the foreground. The graphics data are controllable with the aid of the user-interface device so that the graphical objects are displayable in perspective, positioned one behind the other in a stack, the object displayed in the foreground forming the front face of the stack, and the input device is coupled to the user-interface device such that in response to the input, the graphics data are alterable so that the first object and the objects disposed between the first and the second object in the stack are moved in a direction perpendicular to the stack axis and are hidden, or the objects ordered between the first and the second object, and the second object are made visible and are moved in a direction perpendicular to the stack axis until the second object is displayed in perspective in the foreground. The device is suitable, in particular, for carrying out the method described herein. Thus, it also exhibits the advantages of the method.

Furthermore, a vehicle is equipped with such a device.

Example embodiments of the present invention are described in greater detail below with reference to the Figures.

DETAILED DESCRIPTION

Figure 1:
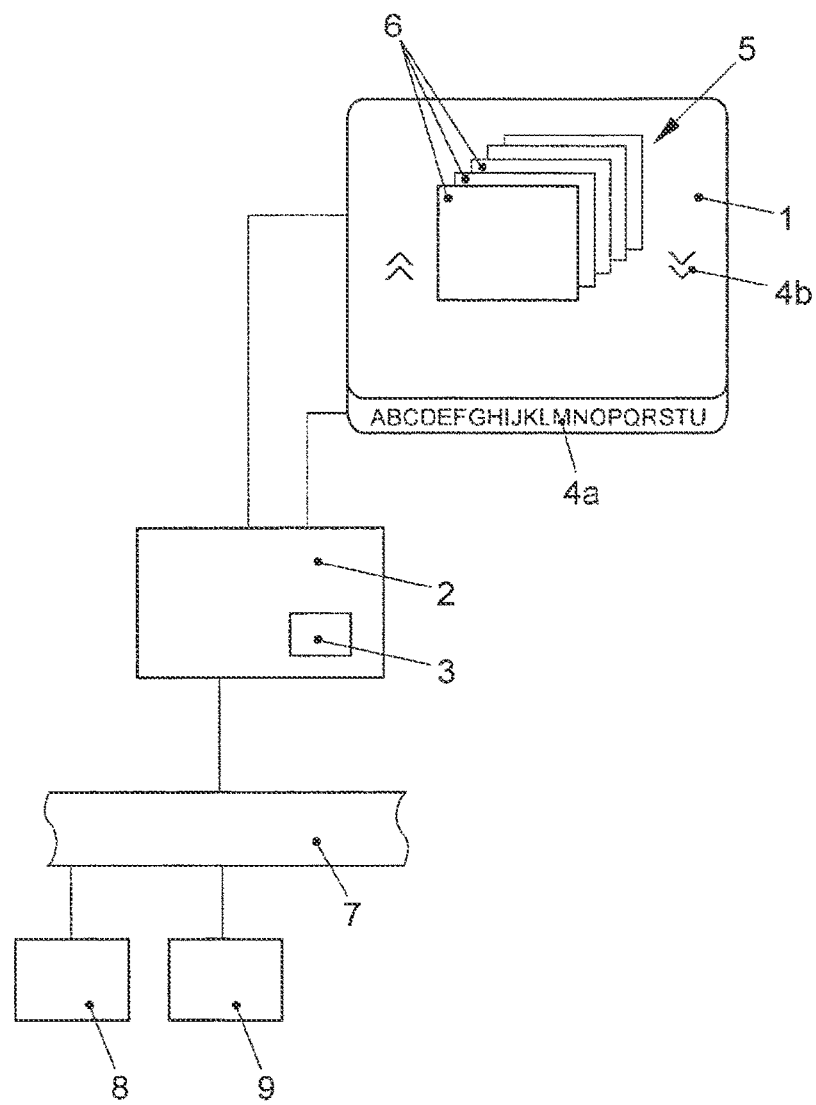
FIG. 1 schematically illustrates a device according to an example embodiment of the present invention for displaying information.

FIG. 1 schematically illustrates a device according to an example embodiment of the present invention for displaying information. The device includes a display area 1 for the graphical representation of information. Display area 1 is freely programmable—i.e., any graphics data as desired may be produced, which are shown on display area 1—and has a touch-sensitive surface. It may be implemented in, e.g., a conventional manner, e.g., as a matrix display, for instance, as an LCD (liquid crystal display), especially as a color display using TFT (thin-film transistor) technology, without limiting the exemplary embodiment to those forms. In particular, display area 1 is mounted in an area of the vehicle that is clearly visible, at least for the driver. For example, display area 1 is accommodated in the center console of the vehicle.

Display area 1 is connected to a user-interface device 2 by which graphics data are able to be generated for graphical objects displayable on display area 1. User-interface device 2 is also connected to push-button switches 4a, via which the user is able to control devices of the vehicle whose information is displayed on display area 1. In addition, the devices of the vehicle may be controlled via buttons 4b displayed on display area 1, as well as with the aid of gestures which are detectable on the touch-sensitive surface of display area 1. Reference is made to German Patent Document No. 10 2007 039 442, cited above and expressly incorporated herein in its entirety by reference thereto, with regard to the variety of input possibilities. In the exemplary embodiment, the vehicle devices mentioned include an infotainment device 8 and a telecommunications system 9 which are connected, from the standpoint of data technology, via data bus 7 in the vehicle to user-interface device 2.

With the aid of arithmetic logic unit 3, user-interface device 2 processes the data, received from devices 8, 9, according to the method, which is described in detail in the following with reference to FIGS. 2a-2f.

Figure 2A:
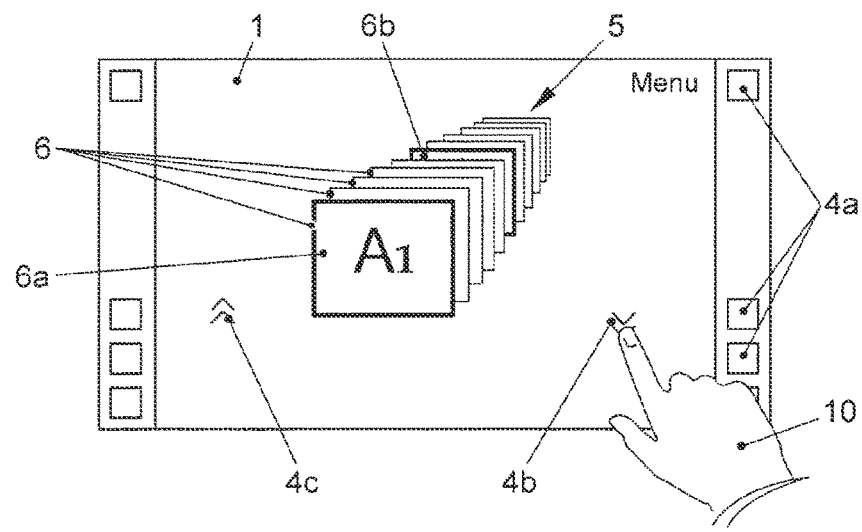
FIGS. 2a-2f show inputs and displays of a plurality of two-dimensional objects on a display area, as produced according to a method according to an example embodiment of the present invention.

FIG. 2a shows a display area 1, on which graphical objects 6 are displayed in perspective, positioned one behind the other in a stack 5, object 6a shown in the foreground forming the front face of stack 5. Graphical objects 6 are pictorially formed lists and represent menu items of an infotainment device 8 in a vehicle. For instance, they represent music titles on a CD (compact disk) able to be played back via infotainment device 8, or a broadcasting station in whose broadcasting area the vehicle is located at the moment. Music title "A1", which is situated on the very top at the front face of stack 5 and is represented by object 6a, is displayed and solely selectable in this representation. If the driver of the vehicle would now like to select a new piece of music, e.g., music title "D5" which is represented by object 6b, then using his hand 10, he would effectuate an input via one of buttons 4b. To that end, for instance, using a fingertip, he touches button 4b which is set apart spatially from stack 5 and is assigned the function of leafing through stack 5 in the viewing direction.

Figure 2B:
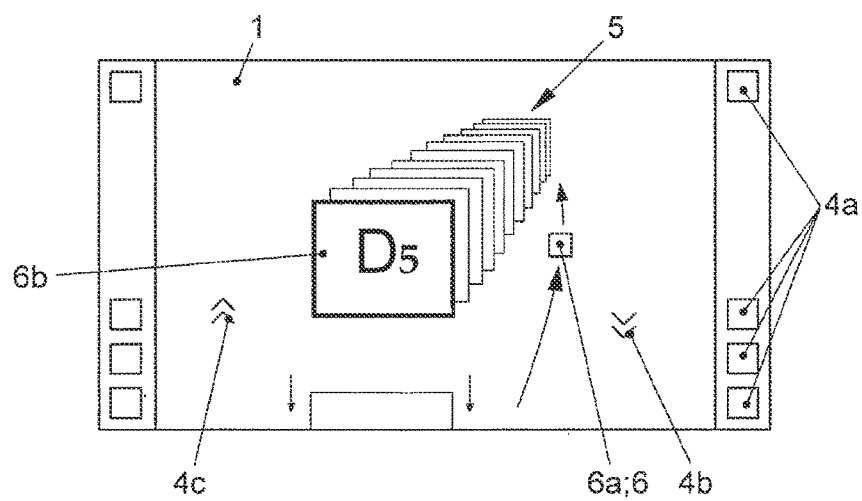

FIG. 2b shows how the graphics data are altered in response to this input. First object 6a and objects 6 disposed between first object 6a and second object 6b in stack 5 are moved individually in succession, vertically downward in perspective, and in the process, are hidden. At the back end of the stack, these objects 6 are sorted in again in perspective, in that they appear again in perspective in the background from below. When desired music title "D5", represented by object 6b, ultimately appears at the front face of stack 5, the driver withdraws his hand 10 from button 4b and the successive hiding process is discontinued.

In the same manner, using button 4c, the driver in FIG. 2a could leaf back in the opposite direction (not shown), which means objects 6 ordered between first object 6a and second object 6b, and second object 6b would be made visible vertically from below, until second object 6b would be shown in perspective in the foreground. Accordingly, the other objects 6 of stack 5 would shift rearward in perspective. This type of representation produces the three-dimensional impression, as though individual objects 6, 6b come out of the depth and go back into the depth again.

In the case of this operator-control action executable bidirectionally, objects 6 are hidden or unhidden in the same direction as represented on respective button 4b, 4c, which makes the input on the part of the driver and the image change thereby triggered especially intuitive and easily comprehensible visually.

Alternatively, the function of leafing forward and backwards, assigned to buttons 4b, 4c, may also be assigned to one of push-button switches 4a disposed at the edge of display area 1, so that the driver could also have made the input by actuating these push-button switches 4a.

Figure 2C:
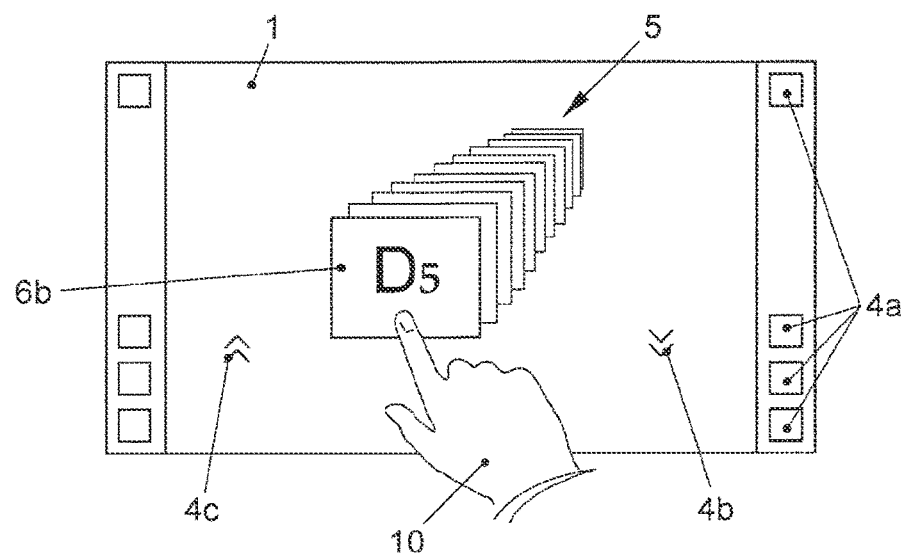
Figure 2D:
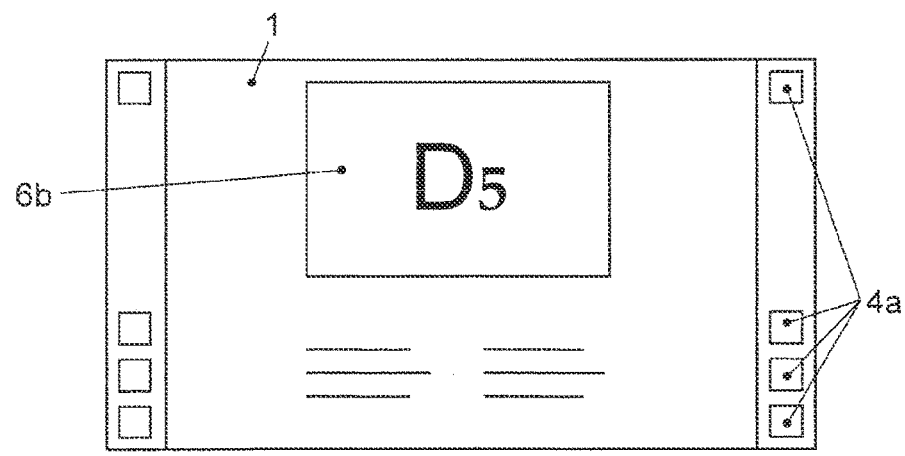

If, by his input, the driver has changed the display as desired according to the exemplary embodiment of the method, the desired music title "D5", represented by object 6b, is displayed to him on the front face of stack 5. The driver is able to open this object, e.g., by simply touching the corresponding region on display area 1, as shown in FIG. 2c. The detail view in the underlying menu hierarchy is shown in FIG. 2d. There, secondary information, such as title, artist, length of the soundtrack or further functionalities are displayed to the driver. In addition, context-specific functionalities of adjacent push-button switches 4a, such as "now playing" or "take over music title as favorite", may be displayed to the driver on display area 1 next to push-button switches 4a.

Figure 2E:
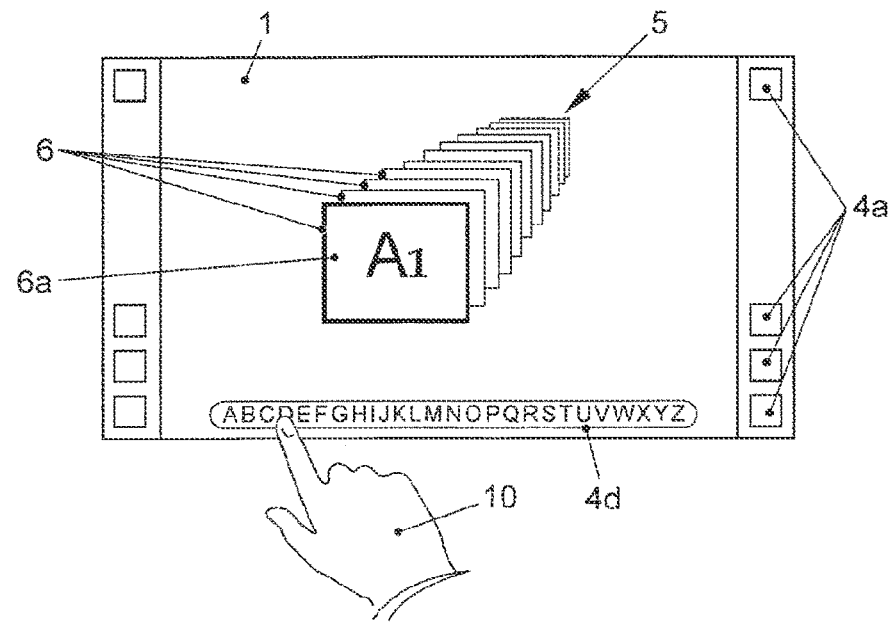
Figure 2F:
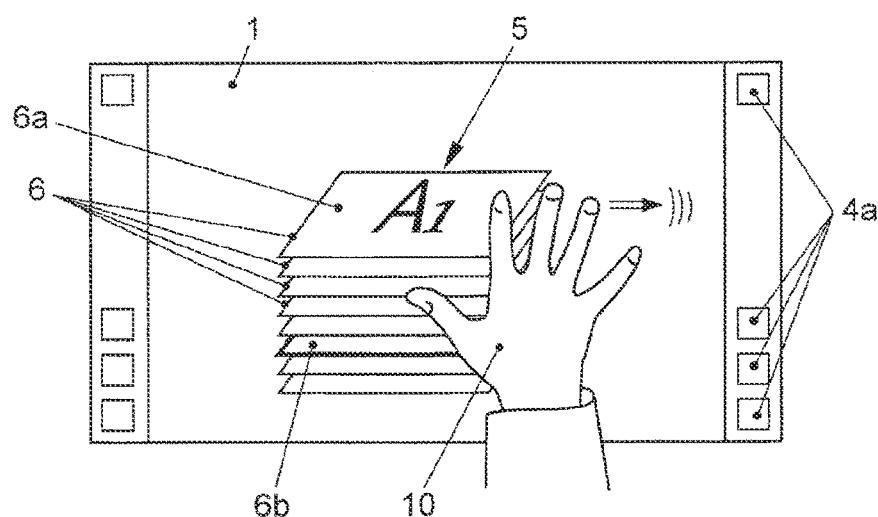

FIGS. 2e and 2f show further forms of the type of user input. In FIG. 2e, the input is accomplished via an alphabetical bar which may be made visible, specific to the context, in the form of an elongated button 4d at the lower edge of display area 1. In particular, it may be expedient for many application programs to search alphabetically or at least to accelerate the search process by an alphabetical preselection. Thus, for example, the search for music title "D5" described above could be carried out initially by the rough preselection of the letter "D" on button 4d, in doing which, objects 6 in the block are hidden downward. The fine selection may be made in the steps described with reference to FIGS. 2a to 2b.

FIG. 2f shows how the input is made by a gesture on the touch-sensitive surface of display area 1. In this case, objects 6 are stacked one upon another like a stack of paper. A quick sweep with hand 10 from left to right over stack 5 is interpreted as the input according to the method described several times above, whereby objects 6a, 6 are hidden one after another to the right until object 6b is displayed at the very top of stack 5.

Figure 3:
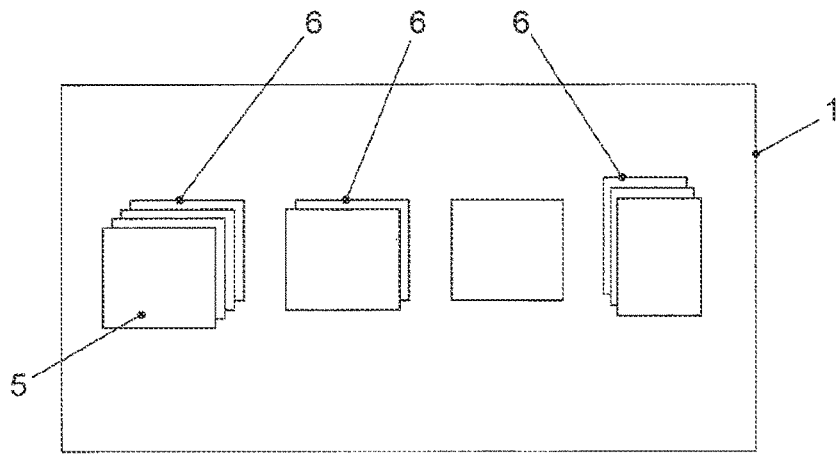
FIG. 3 shows the view of a plurality of stacks of objects in the display mode.
Figure 4A:
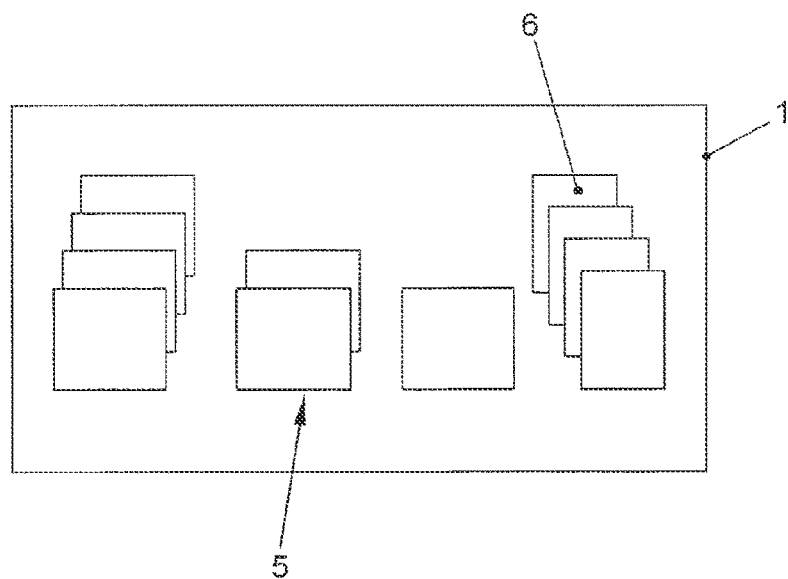
FIGS. 4a-4b show the view of a plurality of stacks of objects in the operator-control mode in two variants.
Figure 4B:
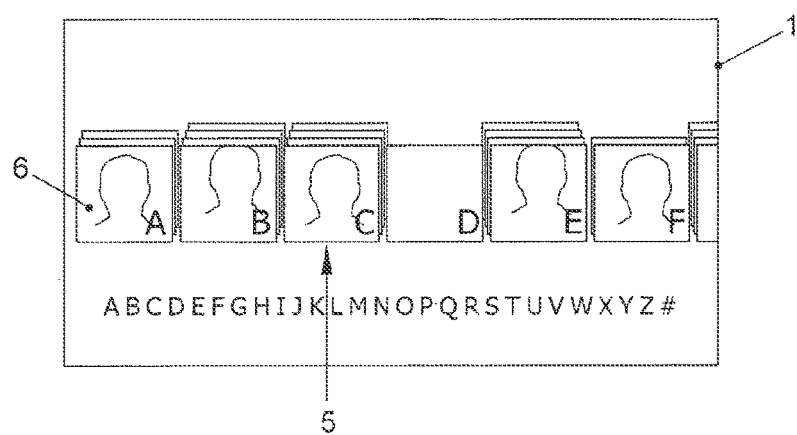

FIGS. 3 and 4a, 4b show a schematic representation of display area 1 with several stacks 5 of objects 6, for instance, for the display of telephone books, stored navigation destinations or available media data files. FIG. 3 shows stacks 5, which represent parts of available lists, in display mode. In the display mode, substantially only objects 6 forming the front side or front face of stacks 5 are represented on display area 1; the other objects 6 of the stack are only implied. In the operator-control mode, to which there is a switchover, for instance, when an operator-control element is approached, especially by a hand, stacks 5 are shown exploded (FIG. 4a and FIG. 4b), so that objects 6 of individual stacks 5 become visible. In this context, objects 6 may be shown separated from each other such that they are selectable individually by an operator-control action.

LIST OF REFERENCE NUMERALS

1 Display area
2 User-interface device
3 Arithmetic logic unit
4a Push-button switch
4b-4d Buttons
5 Perspective stack
6 Graphical objects
6a First object
6b Second object
7 Data bus in vehicle
8 Infotainment device
9 Telecommunications system
10 Hand of a user

What is claimed is:

1. A method for displaying a plurality of two-dimensional, ordered objects on a display area, comprising:
    generating, by a user-interface device, graphics data which control the display area to display a subset of the objects in perspective, a first object of the subset being displayed in perspective in a foreground, the other objects of the subset of objects being displayed in the background, wherein, in a display mode, substantially only the first object is displayed on the display area;
    switching to an operator-control mode in response to an approach toward an input device while in the display mode;
    in the operator control mode, displaying the other objects, positioned one behind the other in a stack having an axis extending into the background of the display, the first object displayed in the foreground forming a front face of the stack; and
    in response to an input by the input device in the operator control mode, altering, by an arithmetic logic unit of the user-interface device, the graphics data to control the display area to move the first object and the objects disposed in the stack between the first object and a different, second object in a direction perpendicular to the stack axis out of the display area, and then to a back end of the stack, in succession with the order of the objects in the stack, such that each object is displayed in perspective in the foreground before being moved, until the second object is displayed in perspective in the foreground, the other objects of the subset of objects being displayed in the background.

2. The method according to claim 1, wherein the first object and the objects disposed between the first object and the second object are hidden one after another, or the objects ordered between the first object and the second object, and the second object are made visible one after another.

3. The method according to claim 1, wherein the graphical objects are displayed in perspective one behind the other in at least two stacks.

4. The method according to claim 3, wherein the display of the stacks represents a number of objects contained in the stack.

5. The method according to claim 1, wherein in the operator-control mode, the stack is displayed in perspective, in exploded manner on the displayed display area.

6. The method according to claim 1, wherein only the object forming the front face is selectable.

7. The method according to claim 1, wherein the input is accomplished via an input device which is in the form of a manual operator-control element and is set apart spatially from the displayed stack or from the display area.

8. The method according to claim 1, wherein the input is accomplished by an operator-control action executable bidirectionally, and the objects arranged between the first object and the second object are hidden or unhidden as a function of a direction of the operator-control action.

9. The method according to claim 1, wherein the objects are displayed on a display area having a touch-sensitive surface, and the input is accomplished by a gesture performed on the touch-sensitive surface.

10. The method according to claim 1, wherein the graphical objects represent menu items of a user menu.

11. The method according to claim 10, wherein the user menu includes media data files of an infotainment device or options of a telecommunications system in a vehicle.

12. A device for displaying a plurality of two-dimensional, ordered objects, comprising:
    a display area configured to display at least one subset of the objects in perspective;
    a user-interface device, configured to generate graphics data of the objects and, with the aid of an arithmetic logic unit, to alter-the graphics data to display a first object in perspective in a foreground, and to display the other objects of the subset of objects in the background; and
    an input device, coupled to the user-interface device, configured to detect an input by which, with the aid of the arithmetic logic unit of the user-interface device, the graphics data are alterable;
    wherein the graphics data are controllable with the aid of the user-interface device to display the subset of objects disposed one behind the other in a stack having an axis extending into the background of the display, the first object displayed in the foreground forming a front face of the stack;
    wherein the input device is coupled to the user-interface device such that, in a display mode, substantially only the first object is displayed in the display area; and in response to an approach toward the input device while in the display mode, switching to an operator-control mode; wherein, in the operator-control-mode, the other objects are displayed; and in response to the input of the input device in the operator-control mode, the graphics data are alterable to control the display area to move the first object and the objects disposed in the stack between the first object and a different, second object in a direction perpendicular to the stack axis out of the display area, and then to a back end of the stack, in succession with the order of the objects in the stack, such that each object is displayed in perspective in the foreground before being moved, until the second object is displayed in perspective in the foreground, the other objects of the subset of objects being displayed in the background.

13. A vehicle, comprising:
a device configured to display a plurality of two-dimensional, ordered objects, including:
   a display area configured to display at least one subset of the objects in perspective;
   a user-interface device, configured to generate graphics data of the objects and, with the aid of an arithmetic logic unit, to alter-the graphics data to display a first object in perspective in a foreground, and to display the other objects of the subset of objects in the background; and
   an input device, coupled to the user-interface device, configured to detect an input and an approach toward an input device by a hand by which, with the aid of the arithmetic logic unit of the user-interface device, the graphics data are alterable;
wherein the graphics data are controllable with the aid of the user-interface device to display the subset of objects; disposed one behind the other in a stack having an axis extending into the background of the display, the first object displayed in the foreground forming a front face of the stack;
wherein the input device is coupled to the user-interface device such that, in a display mode, substantially only the first object is displayed in the display area; and in response to an approach toward the input device while in the display mode, switching to an operator-control mode; wherein, in the operator-control-mode, the other objects are displayed; and in response to the input of the input device in the operator-control mode, the graphics data are alterable to control the display area to move the first object and the objects disposed in the stack between the first object and a different, second object in a direction perpendicular to the stack axis out of the display area, and then to a back end of the stack, in succession with the order of the objects in the stack, such that each object is displayed in perspective in the foreground before being moved, until the second object is displayed in perspective in the foreground, the other objects of the subset of objects being displayed in the background.

* * * * *